Aug. 25, 1953   F. STEICHEN ET AL   2,650,078
APPARATUS FOR THE PRODUCTION OF CALCIUM SUPERPHOSPHATE
Filed Oct. 13, 1950

INVENTORS
F. STEICHEN AND
A. DEBAISIEUX
BY Wenderoth, Lind & Ponack
ATTORNEYS

Patented Aug. 25, 1953

2,650,078

UNITED STATES PATENT OFFICE

2,650,078

APPARATUS FOR THE PRODUCTION OF CALCIUM SUPERPHOSPHATE

Ferdinand Steichen, Anderlecht (Brussels), and Alexandre Debaisieux, Tournai, Belgium Application October 13, 1950, Serial No. 190,022
In Belgium October 25, 1949

3 Claims. (Cl. 259—8)

The present invention relates to a method of continuous production of calcium superphosphate by bringing together natural phosphate containing carbonate, and sulphuric or phosphoric acid, in which the raw materials are mixed in a mixer containing a rotor, the paste resulting from the mixing is collected in a thin layer on a conveyor, and said paste is allowed to harden sufficiently to enable it to be cut up by a disintegrator to which it is conveyed with the aid of said conveyor.

This known process eliminates only part of the disadvantages presented by previously proposed processes, in which the acid and the natural phosphate brought into contact with one another were malaxed and kneaded as long as the fluidity of the paste permitted, in order to eliminate in the malaxator a large proportion of the gases and vapours resulting from the reaction between the acid and the constituents of the natural phosphate. On leaving the malaxator, the paste obtained in this manner fell, generally from a fairly great height, into a chamber in which the reaction was completed. Finally, a plastic mass of great thickness, freed from a large part of the gases which were formed there, was obtained. This mass, on account of its plasticity and its relatively high apparent density, hindered or even made impossible the subsequent removal of the humidity introduced with the acid and of the gases which, despite prolonged malaxation and kneading, remained occluded in the mass. The water which remained imprisoned in the mass, condensed in course of cooling and solidification of the latter, and the final result was a superphosphate of poor physical and chemical properties, in which the liquid phase of the composition was insufficient in order to form a homogeneous mass and resulting in a composition which is insufficiently dry, and results in poor drying into heaps during storage.

These disadvantages have been only partly eliminated by the known process to which reference has been made hereinabove, because the malaxation is carried out with the incorporation of air in the mass, which cools the latter in the malaxator. The calories taken in this manner from the mass reduce the subsequent vaporisation of the water introduced by the acid. In addition, in this process, the mixture is projected out of the mixer through a window provided in the lateral wall. This projection gives rise to degasification and to supplementary cooling, and the shock to which the mass is subjected on encountering the conveyor which receives it causes a further considerable release of the gases already formed.

The present invention has as object a process which gives rise to the formation on the conveyor of a thin and highly porous coat of superphosphate, which then rapidly and easily hardens and which gives rise, before storage, to a superphosphate which is relatively drier and has a relatively lower content of free phosphoric acid than the superphosphate obtained heretofore.

To this end, in the process according to the invention, the mixing is effected in the absence of air with the aid of a turbine having a vertical axis and the peripheral speed of which is, as a minimum, 20 metres per second, and the mixture thus formed is dropped on to the conveyor before a substantial amount of the gas formed by the reaction has been able to be released from the mixture and before the reaction is sufficiently advanced to produce any substantial raising of the temperature of the latter.

The performance of the mixing in the absence of air prevents the incorporation of air in the mixture. The use of a turbine having a vertical axis, the peripheral speed of which, is as a minimum, 20 metres per second, gives rise to ultra-rapid wetting by the acid of the finely ground phosphate introduced into the mixer at the same time as the acid. The violent projection of these raw materials on to the side wall of the mixer destroys the curds which might be formed by the simple bringing into contact of the acid and ground phosphate. Furthermore, the immediate descent on to the conveyor of the mixture thus formed, before the release of a substantial amount of gases originating from the reaction, permits these gases to swell considerably the mass deposited on the conveyor. The swelling of the mass is moreover promoted by placing the reaction chamber under a negative pressure. This swelling is furthermore promoted by the release of the greater part of the heat of reaction after the mass is resting on the conveyor. This heat has the effect of not only expanding the gaseous bubbles which are formed in the still very fluid paste which the conveyor has just received, but also of substantially increasing the vaporisation of the water introduced into the paste with the acid. The water vapour thus formed may be released all the more easily, the more porous the texture of the paste already is and the thinner the layer transported. The paste resting in a thin layer on the conveyor is swollen as if under the action of yeast, and easily doubles in volume under the influence of all these effects. The latter therefore contribute to the very rapid drying and solidification of the mass, which is thus rapidly transformed into a block of considerably drier superphosphate than that obtained by known processes.

In order to carry out this process, use may advantageously be made of a mixer which comprises a reversed vessel in which turns a turbine having a vertical axis and the peripheral speed of which is, as a minimum, 20 metres per second. The lower edge of said vessel is advantageously disposed at a certain distance from a moving band. The speed of movement of the conveyor can then be regulated as a function of the distance separating it from the lower edge of the aforesaid vessel, in such manner as to evacuate, in a layer equal to that distance, an amount of material equal to that introduced during the same period into the mixer. In these circumstances, the fluid mixture leaving the turbine flows to the conveyor without falling thereon, and prevents communication between the interior of the mixer and the atmosphere of the reaction chamber through the bottom of the mixer. Moreover, the cross-section of the conduit supplying liquid and of that supplying solid matters may easily be so selected that these conduits are filled by the materials which they introduce, and consequently prevent the free penetration of air into the mixer during the feeding of the latter.

For preference, this mixer is provided with nozzles for introducing liquid directed so as to project the liquid tangentially in relation to the side wall of the vessel. A further object of the invention is to provide an apparatus for the production of calcium superphosphate by the mixing of ground natural phosphate containing calcium carbonate and a mineral acid, in which apparatus the mixing of the ground phosphate and mineral acid is conducted continuously, vigorously and rapidly and wherein the mixing means employed prevents the introduction of air into the mixture.

The apparatus in accordance with the invention comprises a mixing vessel which is open at its bottom, a lower frustro-conical wall for the vessel which diverges downwardly and has its axis vertical, the angle of the generatrices of the wall with the vertical axis being between about 20° and about 30° and an agitator having a vertical axis rotating in the lower frustro-conical wall, the agitator fitted with pair of opposing blades disposed at three levels, the horizontal projection of the blades at each level having an area at the maximum equal to one-fourth of the difference between the cross section of the mixing vessel at the level considered and the cross section of the axis of the agitator and further provided with means to cause the mixed materials to fall onto said blades.

By virtue of this construction of the apparatus of the invention, the formation of a static coating of the mixture projected by centrifugal force against the walls is avoided. The angle of divergence of the lower frustro-conical wall facilitates the fall of the material being mixed onto the blades at the lower level and whereby the material is additionally subjected to a centrifugal force relative to these walls to cause adding mixing to occur. The rapid mixing obtained is very efficient and a homogeneous product is obtained in a very short period of time, the apparatus adapted particularly to prevent the mixture from accumulating and blocking up the apparatus because of the widened opening at the bottom thereof.

The method according to the invention may likewise be carried out by means of a mixer which advantageously comprises a closed vessel in which turns a turbine having a vertical axis, and the peripheral speed of which is, as a minimum, 20 metres per second, said vessel comprising a base in the form of a clack which is periodically opened and closed by means of a mechanical connection ending in a hydro-electric jack the functioning of which is automatically controlled by means of time relays.

The relays with which this mixer is equipped automatically give rise to periodic connections and disconnections of the supply of electric current to the motor of the oil pump of the jack, either directly or through the medium of a contactor permitting the control with great precision of the times of mixing of the materials and the times of emptying of the mixer.

With such a mixer, the mixture no longer flows in a continuous manner on the conveyor belt. As is known, the hydro-electric jacks which are currently used for the control of the winch brakes of elevating appliances are devices which, in normal service, can carry out several hundreds of operations an hour, so that the intermittent evacuation of the mixer can be regulated in such manner as to be able to be practically identical with a continuous evacuation. The duration of the stroke of the jack can be determined between some tenths of a second and about 1½ second.

Experience has proved that in the case in which the constituents of the superphosphate are mixed, it is not indispensable to interrupt the feeding of the mixer during the emptying of the latter. In fact, the precision of accuracy which is possible, both of the relay and of the hydro-electric jack, permits the discharge of exactly the amount of material which is desired and enables a certain amount of product to be left in the mixer after each emptying. Furthermore the speed of rotation adopted for the turbine does not enable the raw materials to leave the mixer without having been subjected to the very energetic and very rapid action of the blades.

For certain products it may nevertheless be useful to interrupt the feeding of raw materials to the mixer during emptying of the latter. For this purpose, the mixer is utilised in combination with a second time relay which cuts off the feeding of the mixer before the opening of the above-mentioned clack, and restores feeding slightly before the closing of the latter.

The invention likewise relates to an endless, fluid-tight belt conveyor, which is particularly suitable for performing the process of the invention.

Known conveyors of this type comprise essentially a flat or incurvated belt, generally of rubber, which rests on rollers and which is placed in movement by passing over a driving pulley. In other words, this belt constitutes both the carrier member and the driving member.

This solution is not satisfactory because, when the belt conveys a considerable mass, as is the case with belts which convey superphosphate from the mixer to the disintegrator, it is subjected to considerable longitudinal traction and in consequence its life is fairly considerably shortened. The fact that the belt is utilised as a means of transmission of the movement entails the obligation to use belts having a core of textile material clothed in rubber. In particular, in the case of the transportation of superphosphate in course of manufacture, after a relatively short time of utilisation cracks are formed, under the action of heat and of the chemical agents, in the protective rubber layer. These cracks tend to be enlarged under the action of the tractive stresses, and the free phosphoric acid infiltrating into the fissures formed destroys the fabrics and necessitates the scrapping of the belt.

In the conveyor according to the invention, the part of the fluid-tight endless belt covered by the materials to be transported rests freely on supports fixed to endless straps which receive the driving action.

As a result, the fluid-tight endless belt is subjected to only very little or no tractive stress, the result of which is a far longer life and far greater dependability in operation.

In particular, when the material to be transported is fluid at the commencement of loading, and has to dry during the course of transportation, it is advantageous to utilise a conveyor of this type in which the fluid-tight endless belt rests successively on concave supports fixed to driving straps and on flat supports fixed to other driving straps which run at the same speed as the former.

The use of flat supports at the end of the travel of the loaded part of the belt is furthermore advantageous in the case in which the dried material must be cut up on leaving the conveyor.

Other features and details of the invention will appear in the course of the description of the drawings attached to the present specification, which illustrate schematically, and solely by way of example, one form of construction of the mixer according to the invention.

In these different figures, like references designate like elements.

Figure 1:
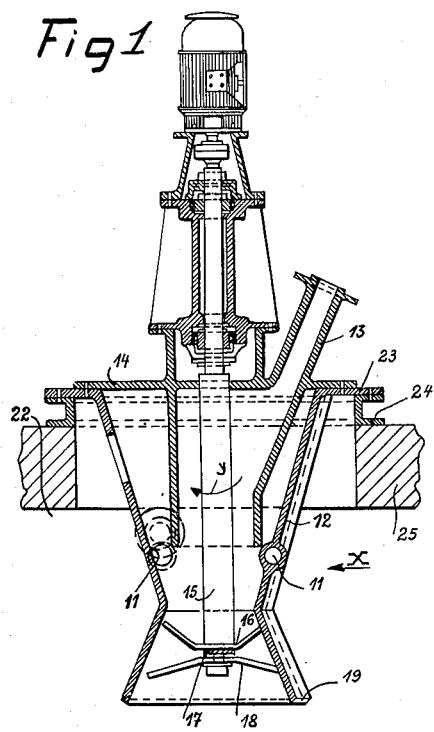
Figure 1 is a staggered vertical section of one embodiment of the mixer according to the invention, this section being taken along the broken line I—I of Figure 2.
Figure 3:
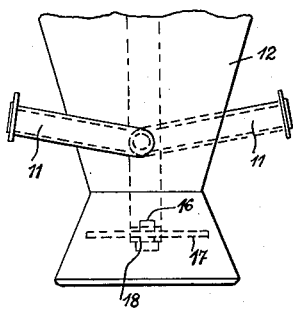
Figure 3 is a view in elevation, in the direction of the arrow X of Figure 1, of a part of the mixer and of the acid supply nozzles.
Figure 2:
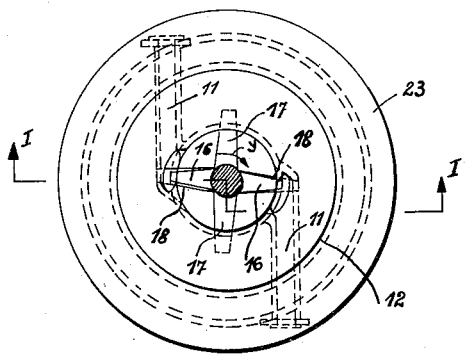
Figure 2 is a plan view of the mixer shown in Figure 1, after removal of the cover.

In Figures 1 to 3, there is shown a mixer 13 provided with nozzles 11 which are supplied with phosphoric acid or sulphuric acid. Through conduit 13, ground natural calcium phosphate which contains calcium carbonate as an impurity is led into the mixer.

The mixer 12 comprises essentially a reversed vessel the base of which is designated by 14, and in which a vertical agitator 15 turns, said agitator equipped with three pairs of blades 16, 17, and 18.

The conduits 10 and 13 have dimensions such that, for the output which the mixer can normally handle, these conduits are filled by the materials which they introduce into the mixer, so that atmospheric air cannot penetrate freely into the mixer despite the continuous feeding of the latter.

The nozzles 11 are directed in such manner as to project the acid on to the side wall of the mixer, causing it to describe a giratory movement in the opposite direction to the direction of rotation of the agitator, represented by the arrow Y. The nozzles 11 are moreover directed in such manner as to project the acid slightly downwards (Figure 3). The side wall is therefore swept by the acid and cleaned from any projections of phosphate. The conduit 13 serving for the introduction of the phosphate is disposed in such manner as to drop the latter on to the blades near the shaft of the agitator, and consequently without touching the side wall.

As can be seen, the cross-section of the mixer decreases from top to bottom until above the blades, as the result of the truncated cone shape of the upper part of the mixer, the small base of which is situated towards the lower part of the mixer.

The blades 16, 17 and 18 are surrounded by a lower frustro-conical wall which diverges downwardly and has its axis vertical.

From Figure 1 of the drawing, it is seen that the angle of the generatrix of the lower, downwardly diverging frustro-conical wall of the chamber and the vertical axis of the chamber is about 23°. This angle which is between 20° and 30° facilitates the fall of the material being mixed onto the blades which are found at the lower level and avoids the formation of a coating of the mixture which has been projected by centrifugal force against the walls.

The increase of the cross-section of the lower part of the mixing chamber takes place from slightly above the upper blades 16 as far as the lower edge 19. The lower blades 18 are longer than the middle blades 17, and the latter are in turn longer than the top blades 16. These different lengths are such that the distance between the ends of the blades and the side wall, which widens out towards the edge 19, is substantially the same whatever the level considered.

The upper blades 16 are situated opposite to one another and are curved upwardly. The lower blades 18 are likewise situated in the prolongation of one another and in the general direction of the upper blades 16, but are curved towards the edge 19. The middle blades 17 are substantially flat blades directed at 90° in relation to the blades 16 and 18 between which they are located.

When the mixer is utilized for the production of calcium superphosphate, it is advantageously disposed in such manner that the mixture formed falls into a reaction chamber 22, which, in a known manner, is maintained under slightly reduced pressure. If the mixture falls onto a continuous conveyor, the speed of which is regulated in such manner that a layer is deposited in a thickness which is equal to the distance separating the conveyor from the lower edge of the mixer, then the output of the mixer will be equal to the flow of the raw materials introduced into the mixer through the nozzles 11 and the conduit 13. The re-entry of air into the mixer during the mixing operation is prevented and the small amount of gas which is formed in the mixer may be drawn through the opening 21 in the reaction chamber.

The body of the mixer rests by an edge 23 on a ring 24 mounted on the roof 25 of the reaction chamber 22. Thanks to this arrangement, the mixer can easily be extracted from the reaction chamber, for example by the aid of a winch, with a view to the replacement of worn blades.

What we claim is:

1. A mixer for the production of calcium superphosphate by the mixing of ground natural phosphate containing carbonate and a mineral acid comprising a mixing vessel open at its bottom, a lower frustro-conical wall for this vessel which diverges downwardly and has its axis vertical, the angle of the generatrices of said wall with the vertical axis being comprised between 20 and 30°, an agitator with a vertical axis rotating in said lower frusto-conical wall, pairs of opposite blades on said agitator disposed at three levels and extending all the further from the axis of the agitator as they are at a lower level, the horizontal projection of the blades at each level having an area at the maximum equal to one quarter of the difference between the cross-section of the mixing vessel at the level considered and the cross-section of the axis of the agitator, the blades of the upper level being curved upwardly, those of the middle level being flat and directed at right angle in relation to the blades of the upper level and those of the lower level being curved downwardly and in the general direction of the blades of the upper level, and means for causing the materials to be mixed to fall onto said blades.

2. A mixer for the production of calcium superphosphate by mixing of ground natural phosphate containing carbonate and a mineral acid comprising a mixing vessel open at its bottom, a lower frusto-conical wall for this vessel which diverges downwardly and has its axis vertical, the angle of the generatrices of said wall with the vertical axis being comprised between 20 and 30°, a turbine with a vertical axis rotating in said lower frusto-conical wall, pairs of opposite blades on said agitator disposed at three levels and having a length such that their distance to the frusto-conical wall is substantially the same whatever the level considered, the horizontal projection of the blades at each level having an area at the maximum equal to one quarter of the difference between the cross-section of the mixing vessel at the level considered and the cross-section of the axis of the agitator, the blades of the upper level being curved upwardly, those of the middle level being flat and directed at right angle in relation to the blades of the upper level and those of the lower level being curved downwardly and in the general direction of the blades of the upper level, and means for causing the materials to be mixed to fall onto said blades.

3. A mixer for the production of calcium superphosphate by the mixing of ground natural phosphate containing carbonate and a mineral acid comprising a mixing vessel open at its bottom, a lower frusto-conical wall for this vessel which diverges downwardly and has its axis vertical, the angle of the generatrices of said wall with the vertical axis being comprised between 20 and 30°, an agitator with a vertical axis rotating in said lower frusto-conical wall, pairs of opposite blades on said agitator disposed at three levels from under the upper edge of said frusto-conical wall to above the lower edge of said wall, such blades having a length such that their distance to the frusto-conical wall is substantially the same whatever the level considered, the horizontal projection of the blades at each level having an area at the maximum equal to one quarter of the difference between the cross-section of the mixing vessel at the level considered and the cross-section of the axis of the agitator, the blades of the upper level being curved upwardly, those of the middle level being flat and directed at right angle in relation to the blades of the upper level and those of the lower level being curved downwardly and in the general direction of the blades of the upper level, and means for causing the materials to be mixed to fall onto said blades.

FERDINAND STEICHEN.
ALEXANDRE DEBAISIEUX.

References Cited in the file of this patent

UNITED STATES PATENTS

| Number | Name | Date |
| --- | --- | --- |
| 51,518 | Martin | Dec. 12, 1865 |
| 646,686 | Du Bois | Apr. 3, 1900 |
| 809,827 | Lucas | Jan. 9, 1906 |
| 1,401,527 | Doyle | Dec. 27, 1921 |
| 1,726,555 | Gammeter | Sept. 3, 1929 |
| 2,148,209 | Loiseau et al. | Feb. 21, 1939 |
| 2,262,293 | Lilja et al. | Nov. 11, 1941 |
| 2,313,760 | McLean | Mar. 16, 1943 |
| 2,442,513 | Sackett | June 1, 1948 |
| 2,528,514 | Harvey et al. | Nov. 7, 1950 |